United States Patent
Krämer

[11] Patent Number: 5,407,395
[45] Date of Patent: Apr. 18, 1995

[54] STEPLESSLY VARIABLE BELT DRIVE FOR BICYCLE

[76] Inventor: Hubert Krämer, Maisacher Str. 82e, D-82256 Fürstenfeldbruck, Germany

[21] Appl. No.: 250,003

[22] Filed: May 27, 1994

[30] Foreign Application Priority Data

Jun. 4, 1993 [DE] Germany .......... 43 18 648.3

[51] Int. Cl.[6] ............................................. F16H 55/00
[52] U.S. Cl. ............................................................ 474/49
[58] Field of Search ................................ 474/49–56, 474/69–71

[56] References Cited

U.S. PATENT DOCUMENTS

| 1,486,590 | 3/1924 | Landahl | 474/49 |
| 2,469,665 | 5/1949 | Patmore | 474/49 |
| 4,892,507 | 1/1990 | Patin et al. | 474/50 |

FOREIGN PATENT DOCUMENTS

| 93896 | 10/1896 | Germany |
| 122517 | 4/1900 | Germany |
| 642664 | 10/1935 | Germany |
| 1188889 | 9/1959 | Germany |

*Primary Examiner*—Michael Powell Buiz
*Attorney, Agent, or Firm*—Herbert Dubno; Andrew Wilford

[57] ABSTRACT

A steplessly variable-ratio drive has a drive wheel having a hub rotatable about a drive axis, adapted to be normally rotated in a forward direction about the axis, and having at least three angularly equispaced pivots radially equispaced from the axis. Respective segments each have an inner end pivoted at the respective pivot on the hub, an outer end radially offset from the respective pivot, and a radially outwardly convex curved outer surface. Respective springs braced generally radially between the outer ends of the segments and the inner ends of the adjacent segments urge the outer ends radially outward. A driven wheel has a hub rotatable about a driven axis substantially parallel to the drive axis, adapted to be normally rotated in the forward direction about the driven axis, and having a plurality of angularly equispaced pivots radially equispaced from the driven-wheel axis. Respective segments each have an inner end pivoted at the respective pivot on the driven-wheel hub, an outer end radially offset from the respective pivot, and a radially outwardly convex curved outer surface. A belt is spanned over and interconnects the wheels.

7 Claims, 2 Drawing Sheets

STEPLESSLY VARIABLE BELT DRIVE FOR BICYCLE

FIELD OF THE INVENTION

The present invention relates to steplessly variable transmission. More particularly this invention concerns a steplessly variable belt drive that is usable on a bicycle or the like.

BACKGROUND OF THE INVENTION

Two types of bicycle transmissions are standard. When a large-number of ratios is needed, both the pedal shaft and back wheel are provided with a plurality of coaxial sprockets of different sizes. A chain spans the two and a derailleur mechanism is provided for shifting the chain on both the front and back sprocket. For hill climbing a small-diameter sprocket on the pedal shaft is connected to a large-diameter sprocket on the rear wheel, and for downhill or on-the-level travel the relationship is changed or reversed. Bicycles having fewer ratios, typically a maximum of three or four, use a planetary-gear transmission inside the rear drivenwheel hub. This latter transmission can be made to operate automatically, in response to torque or force. Both these systems have the disadvantage that only a limited number of ratios is available and the changeover from ratio to ratio involves a step.

Accordingly it has been proposed to replace the chain with a belt and use a belt drive with a steplessly variable input/output ratio having a pair of wheels or pulleys of variable effective diameter or pitch coupled together by the belt. Each wheel is formed of at least three radially displaceable segments that are urged radially outward by springs. The spring forces are such that as tension in the belt increases, that is when torque applied to the drive wheel or pulley increases, the drivewheel diameter decreases in diameter and the rear driven-wheel diameter increases, and vice versa.

As described in German patent 93,896 issued 3 Oct. 1896 to E. A. Ashcroft such a steplessly variable belt drive has spiral springs in the drive and driven wheels, one spiraling in one direction relative to the respective axis and the other spiraling oppositely. The inner ends of the springs are secured to the respective hubs and the outer turn of each spring bears on the radially inner faces of the respective segments. Each wheel has guide plates on which the radially displaceable segments are supported. This structure is cumbersome and difficult to accommodate on a bicycle where space and weight are at a premium, and the rubbing of the segments on the guide plates causes the system to respond sluggishly and malfunction when dirty.

German patent 122,517 issued 13 Apr. 1900 to L. Rottenberg has a spring arrangement involving levers and springs for spreading the pulley segments, and French patent 1,188,899 issued 16 Mar. 1959 use elastically deformable segments for the same effect. Similarly, German patent 642,664 issued 5 Oct. 1935 to K. Heidsieck has pivotal arms whose outer ends define the effective diameter of the pulley and whose positions are controlled by a lever system in turn operated by a planetary-type adjustment mechanism, with no automatic adjustment.

All these systems are relatively bulky and complex. None of them can be retrofitted on an existing bicycle to replace the standard derailleur system and, in effect, provide the bicycle with an automatic transmission.

OBJECTS OF THE INVENTION

It is therefore an object of the present invention to provide an improved steplessly variable-ratio belt drive.

Another object is the provision of such an improved steplessly variable-ratio belt drive which overcomes the abovegiven disadvantages, that is which is particularly suitable for use on a bicycle and which can even be retrofitted to an existing manual gear-change bicycle.

SUMMARY OF THE INVENTION

A steplessly variable-ratio drive has according to the invention a drive wheel having a hub rotatable about a drive axis, adapted to be normally rotated in a forward direction about the axis, and having at least three angularly equispaced pivots radially equispaced from the axis. Respective segments each have an inner end pivoted at the respective pivot on the hub, an outer end radially offset from the respective pivot, and a radially outwardly convex curved outer surface. Respective springs braced generally radially between the outer ends of the segments and the inner ends of the adjacent segments urge the outer ends radially outward. A driven wheel has a hub rotatable about a driven axis substantially parallel to the drive axis, adapted to be normally rotated in the forward direction about the driven axis, and having a plurality of angularly equispaced pivots radially equispaced from the driven-wheel axis. Respective segments each have an inner end pivoted at the respective pivot on the driven-wheel hub, an outer end radially offset from the respective pivot, and a radially outwardly convex curved outer surface. A belt is spanned over and interconnects the wheels.

Thus no guide elements are needed for the radially displaceable segments according to the invention. The hub can be a prior-art item outfitted with the pivots for the pivotal arms of this invention. Smooth-acting journals or bearings at the pivots ensure virtually no friction and the system can be made to be relatively insensitive to dirt and fouling. The system can be produced at low cost since the hub can easily be adapted from standard structure and the springs, bolts, belt, and pivots are all off-the-shelf items; only the segments themselves need to be specifically manufactured for the system of this invention.

The use of one spring per segment makes it relatively easy to adapt the system to different cyclists. A powerful cyclist would need stiffer springs. In addition it is possible to make some of the springs softer than others to emulate the characteristics of the oval drive sprockets used on racing bicycles, that is with a greater mechanical advantage at the part of the stroke where the cyclist's legs are least able to operate forcefully.

According to the invention relative to the normal rotation direction the inner end of each drive-wheel segment leads the respective outer end. Thus the drive-wheel segments work together, with each one bearing on the one ahead of it via the spring. In this manner even if one segment is wholly out of contact with the belt, it will be prevented from swinging out uncontrolledly by the preceding segment which is braced by the respective spring against it.

The outer surface of each driven-wheel segment has a relatively short leading portion ahead of a location aligned radially, when in a position corresponding to minimum driven-wheel diameter, with the respective pivot axis and a relatively long trailing portion behind the location. The portions are outwardly convexly curved and is of increasing radius of curvature away from the location. Thus the driven-wheel segments are largely actuated by the belt, which pulls them out to increase the driven-wheel diameter when the drive-wheel diameter decreases and vice versa. For best operation the outer surfaces of the driven-wheel segments are formed generally as involutes. This minimizes the polygon effect in that it ensures smooth force transmission, even in the maximum-diameter position of the drive wheel or the driven-wheel.

The drive according to the invention can be used with a coaster brake. When the rotation direction of the drive wheel is reversed there is a slight spreading of the driven and the drive-wheel but excellent force transmission to the coaster brake attached to it. Similarly this system can be used in conjunction with a gear-type speed-change transmission.

Furthermore according to the invention the outer end of each drive-wheel segment is generally radially aligned with the inner end of the trailing drive-wheel segment, relative to the direction, and the springs are braced against the inner ends of the drive-wheel segments at locations thereon spaced angularly relative to the direction behind the respective pivots.

The variable-ratio belt drive according to this invention has several large advantages:
 a) In spite of the stepless ratio change, compared with a normal chain-drive, losses are only 4% higher when partially loaded and approximately as low as on a chain-drive when heavily loaded, that is during acceleration or hill-climbing.
 b) Comparing identical bicycles with the same cyclist, one bicycle equipped with the drive of this invention and the other with a standard chain-drive system, the bicycle according to this invention after a given time accelerating from stop was going 10% faster and had traveled about 10% further, as the belt-drive changes the transmission ratio at once and decreases the acceleration torque.
 c) The drive of this invention could be produced largely with off-the-shelf components so it was quite inexpensive.
 d) A bicycle can be equipped with this drive relatively easily, either on original manufacture or as a retrofit.
 e) The drive of this invention works perfectly with a standard coaster brake or hub transmission.
 f) Simply changing the springs allows the response of the drive of the invention to be changed very easily and inexpensively.
 g) When provided with five segments, it is easy to use springs to emulate the oval drive sprocket seen on racing bikes.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
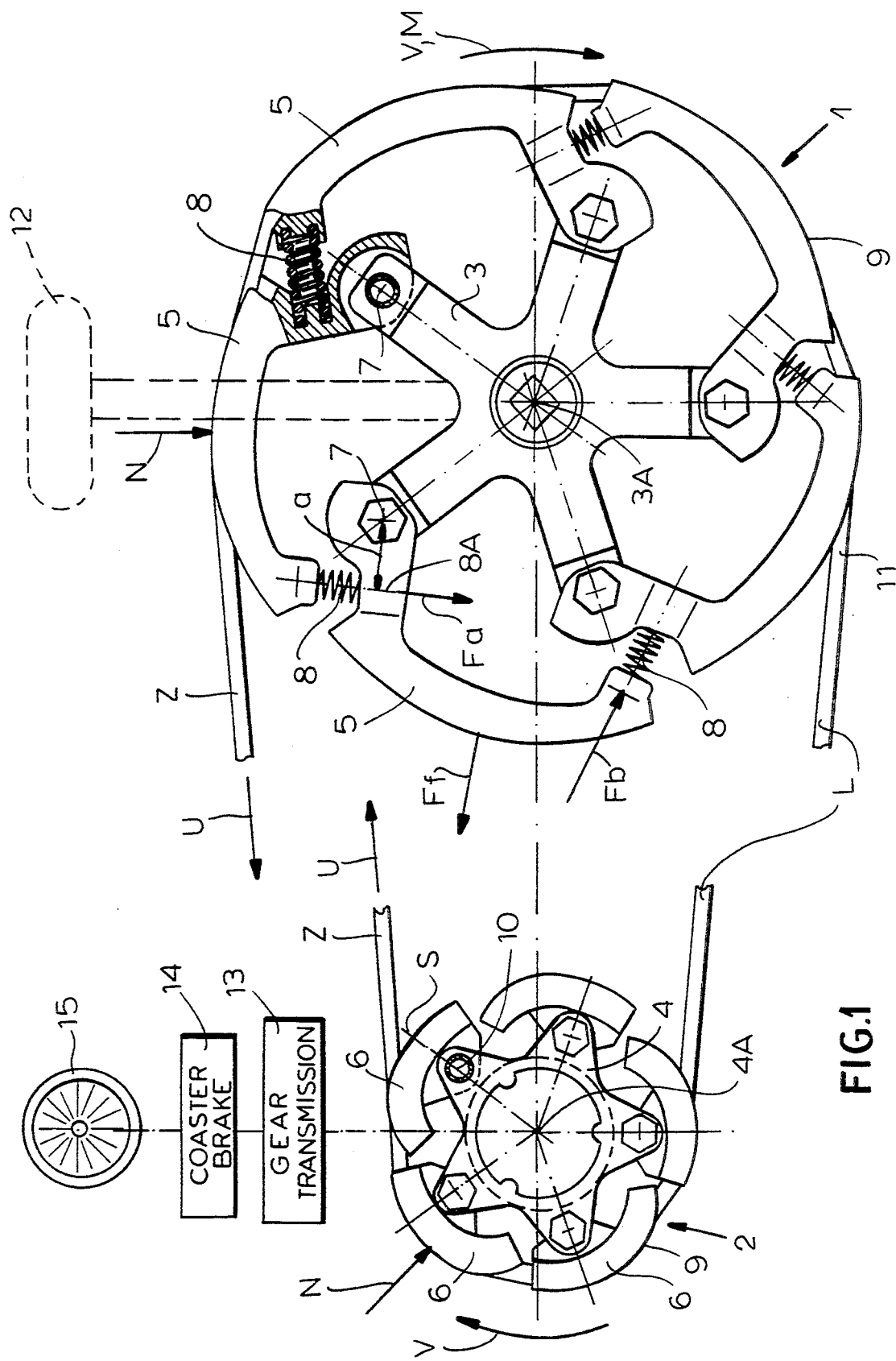
FIG. 1 is a partly sectional side view of the belt drive according to the invention in its position of highest transmission ratio.

As seen in the drawing a variable-ratio belt drive according to the invention has a drive wheel 1 and a driven wheel 2 having respective hubs 3 and 4 rotatable about respective parallel axes 3A and 4A. The front drive wheel 1 is operated by pedals shown in dashed lines at 12 and is normally rotated in a forward direction V and the back driven wheel 2 rotates in the same direction and is connected to a back wheel 15 of a bicycle, if desired through the intermediary of a three, five-or seven- speed gear transmission 13 and a coaster brake 14. The hubs 3 and 4 are formed as five-pointed stars and carry five respective coupling segments or arms 5 and 6 secured at pivots 7 and 10 angularly equispaced about and radially equispaced from the respective axes 3A and 4A. A V-belt 11 is spanned over a groove formed in outer peripheries 9 formed by involute-shaped and outwardly convex outer surfaces of the segments 5 and 6.

Each of the segments 5 has an outer end that is braced by a respective coil compression spring 8 on the inner end of the segment 5 following it in the direction V. Thus these springs 8 which are centered on axes 8A extending at approximately 4° to radii from the axis 3A urge the segments 5 radially outward. The trailing end of each segment 5 angularly overlaps the leading end of the following segment, and the springs 8 are spaced at their trailing inner ends a distance a behind the axis of the segment 5 whose leading end they engage.

Each of the segments 6 is freely pivotable on the respective pivot 10 of the hub 4 and is formed as a two-arm lever. A line S drawn through the respective pivot 10 and the axis 4A subdivides the involute-shaped outer surface 9 of each segment 6 into a short leading portion and along trailing portion. The effective radius of the surface 9 of each segment 6 relative to its pivot axis 10 is shortest on the line S in the small-diameter position of FIG. 1 and increases in both angular directions therefrom.

In the starting position of FIG. 1 which corresponds to normal travel on the level with no acceleration, a normal force N corresponding to the tension U in the upper reach Z of the belt 11 is effective radially inward on the segments 5 and 6. One segment 5 on the wheel 1 will be wholly out of contact with the belt 11 but the force Fa of the spring 8 of the preceding segment 5, which is in contact with the belt 11, will hold this unengaged segment 5 in so it does not swing out uncontrolledly, as the outwardly effective centrifugal force Ff is balanced by the inwardly effective force Fb created by compression of its spring 8. In the driven wheel 2 the segments 6 form due to the influence of the force N the smallest possible effective wheel diameter when the tension U is identical in the upper and lower reaches Z and L of the belt, so long as there is no acceleration.

Figure 2:
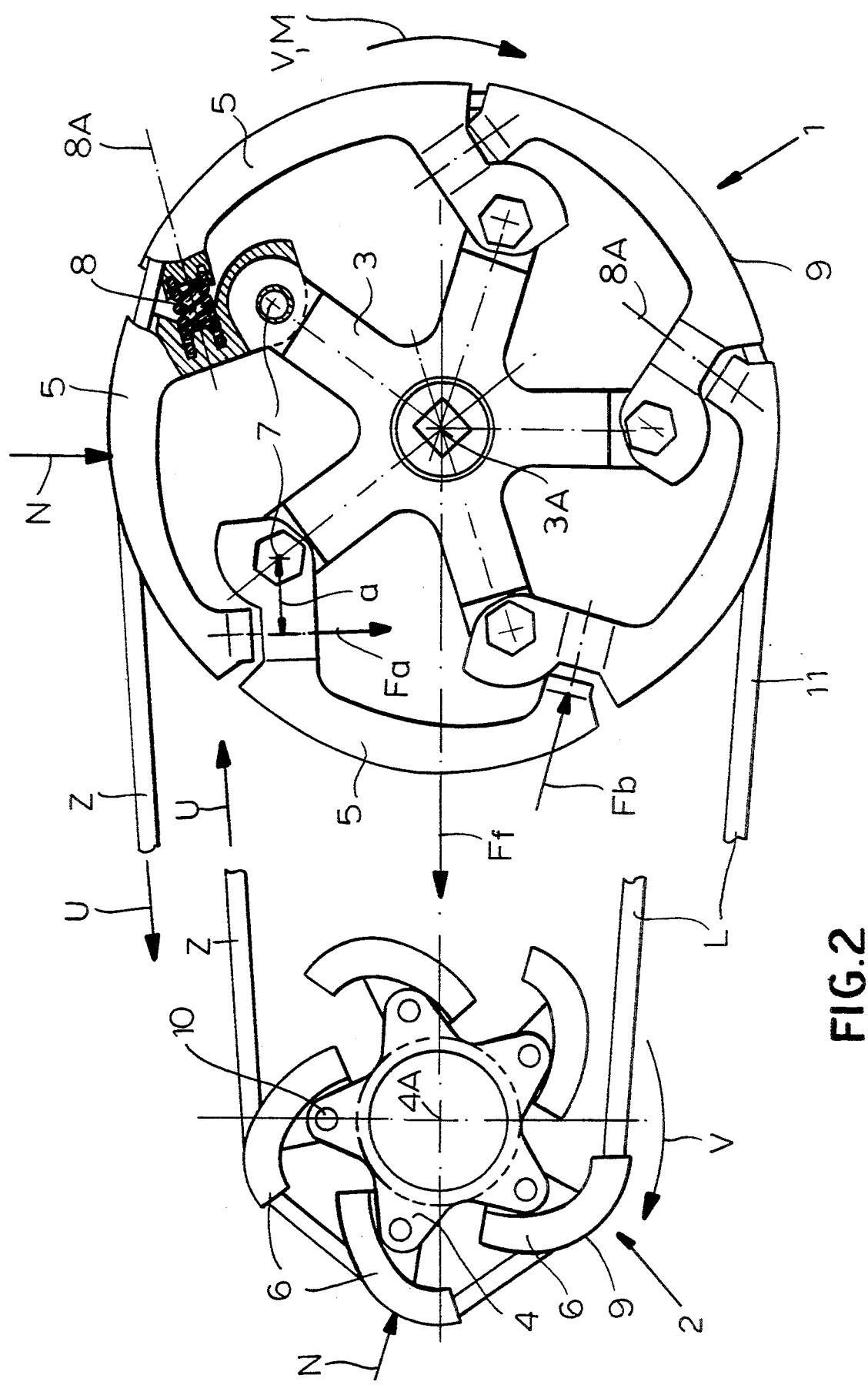
FIG. 2 is a view like FIG. 1 but with the drive at its lowest transmission ratio.

According to FIG. 2 an increase in the torque M on the wheel 3, as during acceleration or hill-climbing, will increase the tension U in the belt and the radially inwardly directed component N of this force U to compress the springs 8 and decrease the effective diameter of the drive wheel 1. The resultant outwardly effective centrifugal force Ff, which is opposite to the holding force Fb, will be balanced by the increasing force Fa. In any case the force Fb is in every condition greater than the opposite centrifugal force Ff.

The increased force N pivots in the segments 5 and decreases the effective diameter of the wheel 1 as stated above. The resultant slack in the lower reach L will allow the segments 6 to pivot out, thereby increasing the diameter of the wheel 2. The belt 11 is left in contact with the curved part of the trailing ends of the segments 6 and is wholly out of the contact with the leading ends. This spreading causes the tension U to increase until the system is again in balance.

As the torque M on the wheel 1 decreases, the springs 8 will expand to increase the diameter of the wheel 1 and decrease that of the wheel 2.

When the wheel 1 is reverse rotated, as for example to actuate a coaster brake connected to the hub 4, the segments 5 will immediately move outward and the segments 6 inward to their FIG. 1 position. As a result of the reverse torque the short leading portion of the segments 6 are forced outbound until the maximum belt tension is reached.

I claim:

1. A steplessly variable-ratio drive comprising:
   a drive wheel having
      a hub rotatable about a drive axis, adapted to be normally rotated in a forward direction about the axis, and having at least three angularly equispaced pivots radially equispaced from the axis,
      respective segments each having an inner end pivoted at the respective pivot on the hub, an outer end radially offset from the respective pivot, and a radially outwardly convex curved outer surface, and
      respective springs braced generally radially between the outer ends of the segments and the inner ends of the adjacent segments and urging the outer ends radially outward;
   a driven wheel having
      a hub rotatable about a driven axis substantially parallel to the drive axis, adapted to be normally rotated in the forward direction about the driven axis, and having a plurality of angularly equispaced pivots radially equispaced from the driven-wheel axis, and
      respective segments each having an inner end pivoted at the respective pivot on the driven-wheel hub, an outer end radially offset from the respective pivot, and a radially outwardly convex curved outer surface; and
   a belt spanned over and interconnecting the wheels.

2. The variable-ratio belt drive defined in claim 1 wherein relative to the direction the inner end of each drive-wheel segment leads the respective outer end.

3. The variable-ratio belt drive defined in claim 1 wherein relative to the direction the outer surface of each driven-wheel segment has a relatively short leading portion ahead of a location aligned radially with the respective pivot axis and a relatively long trailing portion behind the location, the portions being outwardly convexly curved and being of increasing radius of curvature away from the location.

4. The variable-ratio belt drive defined in claim 1 wherein the outer surfaces of the driven-wheel segments are formed generally as involutes.

5. The variable-ratio belt drive defined in claim 1 wherein the driven wheel is provided with a coaster brake.

6. The variable-ratio belt drive defined in claim 1 wherein the driven wheel is provided with a gear-type speed-change transmission.

7. The variable-ratio belt drive defined in claim 1 wherein the outer end of each drive-wheel segment is generally radially aligned with the inner end of the trailing drive-wheel segment, relative to the direction, and the springs are braced against the inner ends of the drive-wheel segments at locations thereon spaced angularly relative to the direction behind the respective pivots.

* * * * *